United States Patent [19]

Pesata, Jr. et al.

[11] E Patent Number: Re. 32,029

[45] Reissued Date of Patent: Nov. 12, 1985

[54] PROCESS TO CONTROL THE CURING REACTION BETWEEN A COPOLYESTER RESIN AND AN EPOXIDE COMPOUND, AND A COMPOSITION FORMED FOR THAT PROCESS

[75] Inventors: Patrick J. Pesata, Jr., Medina; Harlan W. Frerking, Jr., Alliance; Nelson C. Bletso, Kent, all of Okla.

[73] Assignee: The Goodyear Tire & Rubber Company, Akron, Ohio

[21] Appl. No.: 683,888

[22] Filed: Dec. 20, 1984

Related U.S. Patent Documents

Reissue of:

[64] Patent No.: 4,365,046
Issued: Dec. 21, 1982
Appl. No.: 223,973
Filed: Jan. 12, 1981

[51] Int. Cl.[4] ..... C08L 63/00; C08L 67/02

[52] U.S. Cl. ..... 525/438; 524/904; 525/533; 525/934; 528/112; 528/296; 528/297

[58] Field of Search ..... 525/438, 533, 934; 524/904; 528/112, 296, 297

[56] References Cited

U.S. PATENT DOCUMENTS

| | | | |
|---|---|---|---|
| 3,397,254 | 8/1969 | Wynstra | 525/438 |
| 3,548,026 | 12/1970 | Weisfeld et al. | 525/533 |
| 3,749,758 | 7/1973 | Gannon | 528/110 |
| 3,758,633 | 9/1973 | Labana et al. | 525/108 |
| 3,769,226 | 10/1973 | Markovitz et al. | 528/112 |
| 3,842,035 | 10/1974 | Klaren | 525/934 |
| 3,966,836 | 6/1976 | de Cleur et al. | 525/438 |
| 3,988,288 | 10/1976 | Yamauchi et al. | 525/438 |
| 3,989,679 | 11/1976 | Sluis et al. | 525/533 |
| 3,998,905 | 12/1976 | Labana et al. | 525/108 |
| 4,026,862 | 5/1977 | Smith et al. | 525/533 |
| 4,065,438 | 12/1977 | Verborgt | 528/296 |
| 4,071,504 | 1/1978 | Korver | 525/437 |
| 4,085,159 | 4/1978 | Marsiat | 525/438 |
| 4,087,479 | 5/1978 | Toyota et al. | 525/438 |
| 4,112,012 | 9/1978 | de Cleur et al. | 525/438 |
| 4,124,570 | 11/1978 | Scheibelhoffer et al. | 525/437 |
| 4,130,601 | 12/1978 | Ohoka et al. | 525/438 |
| 4,135,009 | 1/1979 | Mercurio | 525/438 |
| 4,140,728 | 2/1979 | Hahn et al. | 525/438 |
| 4,145,370 | 3/1979 | Sreeves | 525/438 |
| 4,147,737 | 4/1979 | Sein et al. | 525/438 |
| 4,169,006 | 9/1979 | Matsubara et al. | 156/182 |
| 4,223,097 | 9/1980 | Johannes et al. | 525/438 |
| 4,255,553 | 3/1981 | Mizumura et al. | 525/533 |
| 4,264,751 | 4/1981 | Scheibelhoffer et al. | 528/302 |

FOREIGN PATENT DOCUMENTS

| | | | |
|---|---|---|---|
| 1381262 | 1/1975 | United Kingdom | 525/934 |

*Primary Examiner*—Ronald W. Griffin
*Attorney, Agent, or Firm*—Alvin T. Rockhill

[57] ABSTRACT

A copolyester resin having modified termini is disclosed, as well as the method for making and using that compound in subsequent reactions with epoxide curing compounds. The polymerization of the copolyester resin may include a compounding preparation stage for modifying the termini of the copolyester resin by reacting those end groups with an aromatic acid to alter the activation energy necessary to cure the modified copolyester resin with the epoxide compound upon mixing and heating of that mixture in a powder coating upon a substrate. The modified copolyester resin improves impact strength and leveling properties between 300° and 450° F., which is desirable for protection of the underlying substrate.

29 Claims, No Drawings

PROCESS TO CONTROL THE CURING REACTION BETWEEN A COPOLYESTER RESIN AND AN EPOXIDE COMPOUND, AND A COMPOSITION FORMED FOR THAT PROCESS

Matter enclosed in heavy brackets [ ] appears in the original patent but forms no part of this reissue specification; matter printed in italics indicates the additions made by reissue.

TECHNICAL FIELD

This application relates to the use of copolyester resins as powder coating resins and the process by which curing of the copolyester resin with an epoxide compound is controlled by the use of an aromatic acid which reacts with the copolyester resin prior to curing with the epoxide compound. Interaction of the termini of the copolyester resin with the aromatic acid increases the activation energy necessary to induce the reaction of the copolyester resin with the epoxide compound upon heating.

BACKGROUND ART

Heretofore, it has been standard and conventional to react copolyester resins with various epoxide compounds to cure those copolyester resins into a coating upon various substrates. To induce the curing of the copolyester resin with the epoxide compound, various curing reaction catalysts have been traditionally introduced at the time of compounding mixtures of the resin and the epoxide compound. Unfettered reaction between the curing reaction catalyst and the copolyester resin establishes curing characteristics which affect the leveling properties of the final coating. Alteration of the curing characteristics may induce shorter curing cycles to speed the curing reaction, but that alteration of cure cycle requirements should not affect the flow characteristics of the copolymer resin during curing. Therefore, the need exists for a reaction which precedes the final compounding and curing of the copolyester resin with the epoxide compound to moderate the reaction of the copolymer resin with the epoxide compound upon mixing of those two materials and heating the mixture.

DISCLOSURE OF INVENTION

It is an object of the present invention to provide a mixture of a copolymer resin and an aromatic acid to control curing of the copolyester resin with epoxide compounds when mixed and heated for final curing in applications to coat a substrate.

It is another object of the invention to provide a process for controlling the activation energy of the curing reaction between the copolyester resin and the epoxide compound, in order to moderate the reactive nature of the termini of the copolyester polymer prior to reacting that material with the epoxide compound.

Yet another object of the invention is to provide a copolyester resin having terminal groups which may be activated by a curing reaction catalyst during polymerization of the copolyester resin and prior to any final compounding with the epoxide compound, subject to control of the activation energy of the curing reaction between that activated copolyester resin and the epoxide compound.

Still another object of the invention is to provide a process for the rapid curing of a copolyester resin, having terminal carboxyl groups which have been activated by a curing reaction catalyst, subject to increased activation energy requirements for the activated termini to monitor and control the leveling properties of the final copolyester-epoxide coating.

Still another object of the invention is to provide a mixture of a copolymer resin having terminal carboxyl groups activated by a curing reaction catalyst and an aromatic acid which controls the activation energy requirements for the reaction between the activated copolyester resin and the epoxide compound.

These and other objects of the present invention, which will become more apparent as the best mode for carrying out the invention is described, are achieved by: a process to control the activation energy of the curing reaction between a copolyester resin and an epoxide compound, comprising:

mixing, with the copolyester resin, from about 0.001 to about 10 weight percent per copolyester resin weight of an aromatic acid having at least one carboxylic acid group and having from 7 to 20 carbon atoms, such that the copolyester resin reaction with the epoxide compound requires a higher activation energy to induce the curing of the copolyester resin after compounding with said epoxide compound and during heating of the copolyester resin-epoxide compound mixture.

The objects of the invention are also achieved by a copolyester resin subject to control with an epoxide compound, comprising: the mixture of the copolyester resin and an aromatic acid, said reaction product having a moderated termini for controlled curing upon heating of the mixture of said reacting product and an epoxide compound, said aromatic acid having at least one carboxylic acid group and having from 7 to 20 carbon atoms, said aromatic acid reacting in a concentration from about 0.001 to about 10 weight percent per copolyester resin weight.

BEST MODE FOR CARRYING OUT THE INVENTION

Copolyester resins, as described above, react with various curing agents to form industrial coating resins for various substrates such as appliances and as decorative finishes on outdoor furniture and other similar applications. Typically, these resins are the combination of the copolyester resin with a curing agent, which may be an epoxide compound when the copolyester resin has terminal carboxyl groups. The properties of the final resin compound are dependent upon the chemical and physical properties of the copolyester resin prior to final compounding, the method by which the copolyester resin is reacted with the curing agent, and the mechanism of curing between the copolyester resin and the curing agent.

As described in U.S. Pat. No. 4,124,570 and U.S. Pat. No. 4,264,751, both of which are assigned to the Assignee of this application, copolyester resins may be produced to have significant hydroxyl end group concentration. The curing agent for these copolyester resins typically may be a melamine or an isophorone diisocyanate.

When copolyester resins have significant carboxyl group concentration, the curing agent may be an epoxide compound. Therefore, the reaction mechanism of the copolyester resin with epoxide compounds require the copolyester resin to have a significant carboxyl end group concentration on the termini of the copolyester polymers.

The production of the copolyester resin conventionally employs three stages: an esterification stage, a condensation stage, and a finishing stage. The preparation of the polyester prepolymer occurs in the esterification stage by the reaction of a diol and a dicarboxylic compound. Optionally, the introduction of a chain branching agent in the esterification stage such as that disclosed in U.S. Pat. No. 4,264,751, may produce a polyester prepolymer having internal chain branching which has been found by that inventor to lower the melt viscosity of the polyester at a given molecular weight to improve the leveling properties of the final powder coating. Leveling properties are defined to be that property yielding a smooth and substantially untextured finish over a smooth surface substrate, such as polished metal.

Further, introduction of a multi-functional alcohol chain branching agent into the esterification stage creates a polymer having an increased hydroxyl number, which, upon carboxyl end group capping, minimizes the excessive charging of that carboxyl capping agent. That agent, remaining unreacted in excessive concentrations, may be toxicologically undesirable.

The polyester prepolymer, whether subjected to internal chain branching or not, is polycondensed in the condensation stage to produce a copolyester resin having an intrinsic viscosity from about 0.10 to about 0.26 dl/g and preferably from about 0.12 to about 0.22 dl/g. Intrinsic viscosity is determined by a method utilizing a 60/40 (by weight) mixture of phenol/tetrachloroethane as a solvent and a reading of intrinsic viscosity at 30° C., according to Goodyear Polyester Method R-100e.

The dicarboxylic compound of the present invention may be either a dicarboxylic acid or dicarboxylic ester. The dicarboxylic acids may be an alkyl dicarboxylic acid having a total of from 2 to 16 carbon atoms, or an aryl dicarboxylic acid having a total of from 8 to 16 carbon atoms.

Specific examples of alkyl dicarboxylic acids suitable for the present invention are oxalic acid, malonic acid, succinic acid, glutaric acid, adipic acid, pimelic acid, suberic acid, azelaic acid, sebacic acid, and the like. Various examples of an aryl acid include the various isomers of phthalic acid, such as paraphthalic (terephthalic) acid an naphthalic acid. Specific examples of alkyl substituted aryl acids include the various isomers of dimethylphthalic acid, such as dimethylisophthalic acid, dimethylorthophthalic acid, and dimethylterephthalic acid; the various isomers of diethylphthalic acid, and diethylterephthalic acid; the various isomers of dimethylterephthalic acid, such as 2,6-dimethylnaphthalic acid and 2,5-dimethylnaphthalic acid; and the various isomers of diethylnaphthalic acid. Generally dimethylterephthalic acid and terephthalic acid are the preferred dicarboxylic acids.

In lieu of the various dicarboxylic acids, the various diesters thereof may be utilized. Thus, the dicarboxylic compound may be an alkyl diester containing a total of from about 2 to 20 carbon atoms, as well as the alkyl substituted aryl diesters containing from about 10 to about 20 carbon atoms. Examples of specific alkyl diesters include dimethyl adipate, diethyl adipate, and the like. Specific examples of the various alkyl substituted aryl diesters include the various isomers of dimethylphthalate, the various isomers of diethylphthalate, the various isomers of dimethylnaphthalate, and the various isomers of diethylnaphthalate. Of the dicarboxylic diesters, preferably, the various isomers of dimethylphthalate (dimethylterephthalate) are used.

Of the dicarboxylic compounds, the various isomers of dimethylterephthalate are most preferred.

These carboxylic acids or the diesters thereof react in the esterification stage with a diol containing from about 2 to 10 carbon atoms. The glycols may be straight-chained or branched. Specific examples include ethylene glycol, propylene glycol, trimethylene glycol, 1,2-butane diol, 1,3-butane diol, 1,4-butane diol, 2,3-butane diol, neopentyl glycol, hexamethylene glycol, cyclohexane dimethanol, and the ester diol product of neopentyl glycol and hydropavalic acid (propanoic acid, 3-hydroxy-2,2 dimethyl-3 hydroxy-2, 2 dimethyl propyl ester). Of the various diols, neopentyl glycol is most preferred. The diol is added to the esterification stage in the reactant charging step in a concentration in comparison to the dicarboxylic compound in a mole ratio from about 2.20 to about 1.15:1. Preferably, the molar ratio is from about 1.7 to about 1.3:1.

In those circumstances when an internal chain branching agent is desirable, the chain branching agent of the present invention is a compound having at least a functionality of 3 to incorporate within the chain of the polyester prepolymer and retain a branch reactive site. Chain branching agents having at least a trifunctionality include trimellitic anhydride, pentaerythritol, glycerol, trimethylol propane, triethylol propane, and other multi-functional alcohols. The chain branching agent is reacted in the esterification stage in a concentration in comparison with the concentration of the dicarboxylic compound in a mole ratio less than about 0.10:1. Desirably, the chain branching agent has a concentration from about 0.5 to 10 mole percent, comparative to the concentration of the dicarboxylic compound, and preferably in a concentration from about 3 to 5 mole percent.

The esterification stage comprises a reaction charging step and a chain branching agent addition step. The chain branching agent addition step occurs simultaneously with the reactant charging step when the chain branching agent is a multi-functional alcohol such as trimethylol propane, triethylol propane, pentaerythritol, and glycerol. The reactant charging step precedes the chain branching agent addition step when trimellitic anhydride is the chain branching agent. In such later case, the chain branching addition step proceeds after at least 90 percent of the dicarboxylic compound and diol have completed methanolysis. Whereas the esterification stage proceeds uninterrupted or undelayed when the chain branching agent is one of the multi-functional alcohols, an additional 20 minutes is required in the esterification stage before the condensation stage when the trimellitic anhydride is the chain branching agent.

Copolyester resins having carboxyl terminated end groups are prepared to be reacted with the curing reaction catalyst for use in this invention. These copolyester resins preferably have internal chain branching to provide a lower melt viscosity of the polyester at a given molecular weight to improve the leveling properties of the final powder coating. In those circumstances where the copolyester resin produced as described hereinabove does not contain carboxyl terminated end groups, the termini of the copolyester polymer chain must be capped with carboxyl groups for reaction with the epoxide compounds to cure the copolyester resin. The carboxyl capping agents may be any anhydride of a carboxylic acid having at least two acid groups, which upon reaction with the terminus of the polyester chain, retains a free carboxyl acid group as a reactive site for activation by the curing reaction catalyst. Specific examples of these anhydrides include anhydrides of the formula:

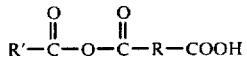

where R is selected from the group consisting of an alkyl radical having from 1 to 18 carbon atoms, a halo-substituted alkyl radical having from 1 to 18 carbon atoms, a hydroxy substituted alkyl radical having from 1 to 18 carbon atoms, an aryl radical having from 6 to 24 carbon atoms, an aralkyl radical having from 7 to 24 carbon atoms; where R′ is an organic radical volatile at temperatures of the carboxyl capping reaction; anhydrides of the formula:

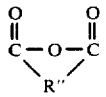

where R″ is an organic radical having from 1 to 18 carbon atoms. Desirably, anhydrides of acids having at least 2 carboxylic acid end groups may be used as the carboxylic acid capping agent. Specific examples of these anhydrides are phthalic anhydride, succinic anhydride, trimellitic anhydride, and the like. Of these anhydrides, trimellitic anhydride is preferred.

The carboxylic acid capping agent may be added subsequent to the condensation stage but prior to the finishing stage at a time denominated the compounding preparation stage. In this reactor compounding stage, the carboxylic acid capping agent may be added in a concentration of from about 1 mole percent to about 25 mole percent per mole of carboxylate units contained in the polymer. Desirably, the concentration is from about 10 mole percent to 14 mole percent per mole of carboxylate units. Preferably, the concentration of the carboxylic acid capping agents is about 12.5 mole percent per mole of carboxylate units.

After the copolyester resin has been polycondensed in the condensation stage to have significant carboxylic acid end groups, or in the circumstance where the copolyester resin having hydroxyl end groups has been capped with carboxyl end groups in the reactor compounding stage, that same stage of the polymerization permits the initial reaction of the copolyester resin with the aromatic acid. This reaction between the aromatic acid and the copolyester resin controls the activation energy required for the subsequent reaction between the copolyester resin as modified and the epoxide compound in the presence of a curing reaction catalyst. The aromatic acid is introduced at the reactor compounding stage, which is a stage of polymerization. Alternatively, the aromatic acid may be introduced at the time of mixing of the copolyester resin and the epoxide compound. In the latter alternative, it is desirable to have reacted the copolyester resin with a curing reaction catalyst in the reactor compounding stage, such as described in related copending application U.S. Ser. No. 223,972, *now U.S. Pat. No. 4,370,452* presently pending and assigned to the common assignee as that assignee of this application. The subject matter of the copending application, and its relation to activation of termini of the copolyester resin during the reactor compounding stage is hereby formally incorporated by reference as if fully rewritten herein. However, for purposes of continuity, interrelated sections of that application are found here.

When employing the reactor compounding stage to introduce the modifying materials of the present invention, temperatures within the compounding preparation stage should range from about 150° to about 275° C. Desirably, the temperature should range between 200° and 250° C., and preferably the range of temperature is from about 210° to about 235° C. The pressure during the reactor compounding stage is about 1 atmosphere or ambient pressures, although the atmosphere for the reactor compounding stage an inert atmosphere, preferably that of $N_2$.

It has been found by the inventors of U.S. application Ser. No. 223,972 that the activation of the termini of the copolyester resin during the reactor compounding stage does not affect the chemical properties of the copolyester resin. Therefore, the intrinsic viscosity of the copolyester resin having termini activated by the curing reaction catalyst may range from about 0.12 to about 0.35 dl/g and desirably from about 0.12 to about 0.22 dl/g. Further, the glass transition temperature of the copolyester resin having activated termini is at least 40° C. and desirably from about 60° to about 75° C. Preferably, the intrinsic viscosity of the copolyester resin having activated termini is about 0.19 and the glass transition temperature is about 68° C. The copolyester resin having activated termini is a stable product of itself, capable of storage for indefinite periods of time before compounding with the epoxide compound. As such, the activation of the termini of the copolyester with the epoxide compound, a concept unknown in the conventional art.

It has been found by the inventor of related U.S. application Ser. No. 223,972 that the reaction mechanism for curing of the copolyester resin with the epoxide compound requires an activated termini for the copolyester resin. These activated termini are generated in the first steps of the reaction by the reaction of a curing reaction catalyst with the carboxyl terminus of the copolyester polymer. It has also been found by that inventor of related U.S. application Ser. No. 223,972 that the reaction mechanism for curing the copolyester resin with the epoxide compound has a reaction rate probably determined by this initial activation of carboxylic acid termini. Therefore, preparation of the activated termini for the copolyester resins during polymerization, yielding a stable product, permits a rapid curing of the activated copolyester resin upon mixing with the epoxide compound and subsequent heating of the mixture. Because as a stable product, the activated copolyester resin may be stored indefinitely, the polymerization of the copolyester resin may proceed from the reactor compounding stage through to the finishing stage. Subsequently, at a time determined by manufacturing parameters, the reaction product of the copolyester resin and the curing reaction catalyst is mixed with the epoxide compound, and upon heated application, more rapidly cures with the epoxide compound, which yields a coating material having greater impact strength. Further, gel time is reduced and the curing cycle is minimized, both indicative of the greater strength of the copolyester compounded and cured when activated by the curing reaction catalyst prior to final compounding and mixing with the epoxide compound.

In the circumstance where the termini of the copolyester resin have been activated by the curing reaction catalyst during the reactor compounding stage, the aromatic acid to moderate the activated termini of that modified copolyester resin may also be added during the reactor compounding stage of polymerization. It has been found by the inventors herein that the aromatic acid reacts subsequent to the reaction of the curing reaction catalyst with the copolyester resin, such that the termini of the copolyester resin are activated by the catalyst and then are moderated by the aromatic acid. The moderated termini of this copolyester resin, twice modified, require a greater activation energy for subsequent curing with the epoxide compounds, which permits a controlled curing to maximize leveling properties of the final coating at application temperatures between 300° and 450° F.

By moderating activated termini of the copolyester resin, the flow characteristics of the copolyester are improved by a longer gel time within the same cure cycle used by the activated termini. Hence, the curing reaction of the moderated termini has similar increased velocity as that for the curing reaction of the activated termini (both increased in comparison with the curing reaction of conventional termini). However, the curing reaction of the moderated termini has an altered acceleration compared with the curing reaction of the activated termini. This altered acceleration occurs during the time preceding gelation, such that gel times are slower for moderated termini, thereby introducing better flow properties into the copolyester. Therefore, without sacrificing the improvement by the activated termini regarding cure cycles, the moderated termini improve flow by controlling gel times within the improved cure cycle. In essence, maximization of gel time in a minimized curing cycle is desired to achieve a high gloss, low texture coating.

The copolymer resin having the activated termini subsequently moderated in a stable product of itself capable of storage for indefinite periods of time before final compounding with the epoxide compounds. As such, the moderating of the activated termini of the copolyester resin may proceed any compounding of the copolyester with the epoxide compound, a concept unknown in the conventional art. By the term final compounding, it is meant any compounding of the copolyester and the epoxide compound by any process, for example, extruding and the like.

It has been found by the inventors herein that the moderating of the activated termini of the copolyester resin during the reactor compounding stage does not affect the chemical properties of the copolyester resin. Therefore, the intrinsic viscosity of the copolyester resin having activated termini controlled by the aromatic acid may range from about 0.12 to about 0.35 dl/g and desirably from about 0.12 to about 0.22 dl/g. Further, the glass transition temperature of the copolyester resin having activated termini is at least 40° C. and desirably from about 60° to about 75° C. Preferably, the intrinsic viscosity of the copolyester resin having controlled activated termini is about 0.19 and the glass transition temperature is about 68° C.

As described above, the aromatic acid may be mixed with the copolyester resin and the epoxide compound, during final compounding of those two materials for subsequent heating and curing upon a substrate. The aromatic acid may be mixed with a copolyester resin having activated termini, forming a modified resin that is a stable product of itself.

The aromatic acid may be any acid having at least one carboxylic acid group and having from 7 to 20 carbon atoms. Desirably, the aromatic acid is benzoic acid or an acid having the formula

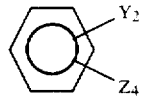

where Y is selected from carboxylic acid substituted alkyl radicals having from 1 to 10 carbon atoms and combinations thereof, and where the Y groups may be the same or different, and where Z is selected from hydrogen, and alkyl radicals, substituted or unsubstituted, having from 1 to 10 carbon atoms and combinations thereof, and where each of the Z groups may be the same or different. Preferably, the aromatic acid is isophthalic acid.

The aromatic acid may be added to the reactor compounding stage or during the final compounding of the copolyester resin with the epoxide compound and a concentration from about 0.001 to about 10 weight percent per copolyester resin weight. Desirably, the concentration of the aromatic acid is from about 0.01 to 8 weight percent copolyester resin weight. Preferably, the concentration of the aromatic acid is from about 0.5 to about 2 weight percent per copolyester resin weight. Optimally, the concentration of isophthalic acid is about 1 weight percent per copolyester resin weight.

In order to demonstrate the best mode for carrying out the invention, reference is made to the following example which demonstrates the use of a hydroxyl terminated copolyester resin having end groups capped by carboxyl groups, subsequently having those end groups activated by the epoxide catalyst, and subsequently having the activated end groups of the modified copolyester resin arrested by the aromatic acid groups appended thereon.

EXAMPLE

Polyester Preparation

Ten pounds of neopentyl glycol was charged into the first vessel of a 25 pound reactor and melted. 21.4 pounds of dimethyl terephthalate, 254 grams of trimethylol propane, and an additional 10 pounds of neopentyl glycol were then added and the mixture was brought to 190° C. and held there until the mixture became a homogeneous solution. The agitator was then started and 5.01 grams of dibutyl tin oxide, together with 8.41 grams of sodium acetate, were added to catalyze the polymerization reaction in the esterification stage. The temperature was raised slowly to 210° C. and maintained until methanolysis was complete. Typically, about 3,800 milliliters of methanol was collected. The vessel was then evacuated to a pressure of approximately 10 millimeters, and neopentyl glycol was distilled from the reaction vessel until an intrinsic viscosity of about 0.185 dl/g was attained. The temperature was maintained at approximately 225° C. during this operation. The pressure in the vessel was then returned to ambient pressure of 1 atmosphere and the polymer was transferred to a second vessel and cooled to about 210° C. 1376.2 grams of trimellitic anhydride, 270 grams of isophthalic acid and 82.8 grams of benzyl trimethyl ammonium chloride were added and the polymer was agitated for one hour. The resulting polymer had the following stable properties:

Intrinsic viscosity—0.213

Acid number—61 milligrams KOH/g

Glass transition temperature—73° C.

Stoichiometric mixtures of this modified copolyester resin and a bisphenol-A based epoxy resin (Ciba Geigy Araldite GT-7013) were prepared by grinding the two resins together with a mortar and the pestle until the mixture had the consistency of flour.

The following data was obtained from this mixture:

Gel time (204° C.)—45 seconds

Cure rate (182° C.)—0.104 $sec^{-1}$

Activation energy—16.6 kcal/mole curing reaction rate constant after mixture with the epoxide compound is similar to the constant for the activated termini, demonstrating comparable cure cycles. However, activation energy is increased which slows the initial stage of reaction permitting longer gel times. Improved flow is seen in the extruded product as measured by pill flow. The glass transition temperature is maintained despite moderation of termini of the copolyester.

TABLE

COMPARISON OF MODERATED TERMINI WITH UNMODERATED, ACTIVATED TERMINI OF THE COPOLYESTER RESIN

| CO-POLY-ESTER[1] | % BTMAC[2] | % IPA[3] | I.V. | ACID NO. | Tg | MIXING WITH BISPHENOL-A EPOXY RESIN[4]: GEL TIME (secs.) | CURING REACTION RATE CONSTANT AT 182° C. ($sec^{-1}$) | ACTIVATION ENERGY (kcal/mole) | EXTRUDED MIXING[5] WITH EPOXY RESIN, PIGMENT, FLOW AGENTS: GEL TIME (secs.) | PILL FLOW (Inches) |
|---|---|---|---|---|---|---|---|---|---|---|
| 1. (Control) | 0.5 | 0.0 | 0.19 | 51 | 69 ± 3 | 67 | 0.00744 | 14.6 | 96 | 7 |
| 2. | 0.5 | 0.5 | 0.19 | 52 | 69 ± 3 | 72 | 0.00806 | 17.3 | — | — |
| 3. | 0.5 | 2.0 | 0.19 | 54 | 69 ± 3 | 80 | 0.0105 | 17.0 | — | — |
| 4. | 0.5 | 4.0 | 0.19 | 69 | 69 ± 3 | — | 0.00900 | 17.5 | — | — |
| 5. | 0.6 | 1.0 | 0.18 | 55 | 69 ± 3 | 42 | 0.0130 | 16.3 | 93 | 11.9 |
| 6. (Example above) | 0.6 | 2.0 | 0.21 | 60 | 69 ± 3 | 45 | 0.0104 | 16.6 | 94 | 9.6 |

[1]96.2 mole percent neopentyl terephthalate, 87.5 mole percent carboxylate units of dimethyl terephthalate, 3.8 mole percent trimethylol propane, carboxyl capped with 12.5 mole percent trimellitic anhydride.

[2]weight percent of benzyl trimethyl ammonium chloride per weight of copolyester

[3]weight percent of isophthalic acid

[4]Ciba-Geigy GT-7013

[5]Dow DER 663U Epoxy resin, $TiO_2$, Modaflow Flow Agent

Powder Coating Preparation

A powder coating was made from this polyester resin using the following formulation:

Polyester resin—53.1 grams

Der-663U (Dow Chemical)—46.9 grams

Titanium dioxide—50 grams

Modoflow II (Monsanto)—1.5 grams

These ingredients were blended and then extruded using a single screw extruder maintaining a stock temperature of about 280° to about 290° F., with a screw rpm of 80 and a throughput of 25 pounds per hour. The extrudate was crushed and ground to pass through a −170 mesh screen. Test panels were sprayed using an electrostatic spray gun to a 1.5 mil thickness. Experimental results obtained:

Cure cycle—350° F./20 minutes

Gardner impact—160 inch/pounds

Gloss (60°/20° Gardner)—93/65

Gardner b color—0.2

Prior to final curing, the powder had a gel time of 94 seconds at 400° F. and a pill flow at 45° of 9.6 inches (350° F.).

As may be seen by examination of the following table, the introduction of the aromatic acid during the polymerization of the copolyester resin moderates the activated termini of the polyester which alter the gel time of the copolyester resin having the activated termini without affecting the glass transition temperature and the intrinsic viscosity of the copolyester resin. Further, the cure cycle of the copolyester resin as measured by a Particular emphasis is directed to the control of the activation energy, which has been found by these inventors to improve the leveling properties of the final coating on the substrate after curing.

Curing agents suitable for carboxyl terminated end groups as modified by the concepts of this invention may be used. Representative examples include any epoxy resin or epoxide compound such as bisphenol-A type epoxy resins and triglycidyl isocyanurate.

Powder coating resins may be produced from the modified copolyester resin of the present invention by compounding with pigments, flow agents, and the above-described curing agents for application to appliances, outdoor furniture, and other similar substrates.

While in accordance with the patent statutes, a best mode for carrying out the invention has been described, the invention should not be limited thereto or thereby. Consequently, for an understanding of the scope of the invention, reference should be made to the following claims.

What is claimed is:

1. A process to control the activation energy of the curing reaction between a copolyester resin and an epoxide compound, comprising:

mixing with copolyester resin, from about [0.01] *0.001* to about 10 weight percent per copolyester resin weight of an aromatic acid having at least 1 carboxylic acid group and having from 7 to 20 carbon atoms, such that the copolyester resin reaction with the epoxide compound requires a higher activation energy to induce curing of the copolyester resin after compounding with said epoxide compound and during heating of the copolyester resin-epoxide compound mixture;

wherein said polymerization of the copolyester resin comprises an esterification stage, a condensation stage, a reactor compounding stage and a finishing stage; and wherein said mixing occurs during said reactor compounding stage or said finishing stage.

2. A process, according to claim 1, wherein said mixing occurs during the polymerization of the copolyester resin, such that said aromatic acid moderates the termini of the copolyester resin.

3. A process according to claim 2, wherein said reactor compounding stage further comprises reacting from about 0.001 to about 10.0 weight percent per copolyester resin weight of a curing reaction catalyst with the copolyester resin, such that the copolyester resin has activated termini prior to compounding the copolyester resin with the epoxide compound, said activated termini permitting rapid curing of the copolyester resin after said compounding and during heating of the copolyester-epoxide mixture, subject to control and moderation of the activation energy of the curing action by said aromatic acid through said moderated termini.

4. A process, according to claim 2, wherein said esterification stage comprises reacting a diol and a dicarboxylic compound to form a polyester prepolymer;

said dicarboxylic compound is selected from the group consisting of dicarboxylic acids and dicarboxylic esters, said dicarboxylic acids are selected from the group consisting of alkyl dicarboxylic acids having a total of from 2 to 16 carbon atoms, and aryl dicarboxylic acids having a total of from 8 to 16 carbon atoms, said dicarboxylic esters are selected from the group consisting of alkyl diesters having from 2 to 20 carbon atoms, and alkyl substituted aryl diesters having from 10 to 20 carbon atoms;

said diol is in a concentration from about 115 to 220 mole percent of the concentration of said dicarboxylic compound and is selected from the group consisting of diols having from 2 to 10 carbon atoms.

5. A process, according to claim 4, wherein said esterification stage further comprises reacting said diol and said dicarboxylic compound with a chain branching agent to form an internally branched polyester prepolymer;

and said chain branching agent is in a concentration of less than about 10 mole percent of the concentration of said dicarboxylic compound and is selected from the group consisting of trimellitic anhydride, pentaerythritol, glycerol, trimethylol propane, triethylol propane and combinations thereof.

6. A process, according to claim 4 or 5, wherein said condensation stage comprises polymerizing said polyester prepolymer to form a polycondensed copolyester having an intrinsic viscosity of from about 0.10 to about 0.26 dl/g in a 60/40 by weight mixture of phenol/tetrachloroethane, and having a glass transition temperature of at least 50° C.

7. A process, according to claim 6, wherein said reactor compounding stage further comprises reacting a carboxyl capping agent with the copolyester resin so that from 1 mole percent to about 25 mole percent of the total carboxylate units in the finished copolyester are derived from the capping agent.

8. A process, according to claim 7, wherein said carboxyl capping agent is the anhydride of an acid having at least two acid groups, which upon reaction with the terminus of the polymer chain, retains at least one free carboxyl acid group.

9. A process, according to claim 8, wherein said carboxyl capping agent is an anhydride selected from the group of compounds having the following formula:

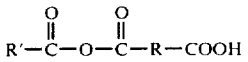

where R is selected from the group consisting of an alkyl radical having from 1 to 18 carbon atoms, a halo-substituted alkyl radical having from 1 to 18 carbon atoms, a hydroxy substituted alkyl radical having from 1 to 18 carbon atoms, an aryl radical having from 6 to 24 carbon atoms, and an aralkyl radical having from 7 to 24 carbon atoms; where R′ is an organic radical volatile at temperatures of the carboxyi capping reaction;

and anhydrides of the formula:

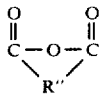

where R″ is an organic radical having from 1 to 18 carbon atoms.

10. A process, according to claim 9, wherein said carboxylic terminus-capping agent is trimellitic anhydride.

11. A process, according to claim 1, wherein said aromatic acid is selected from the group consisting of benzoic acid and compounds having the formula:

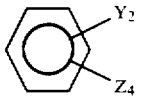

where Y is selected from the group consisting of carboxylic acid substituted alkyl radicals having from 1 to 10 carbon atoms and combinations thereof, and where the Y groups may be the same or different;

and where Z is selected from the group consisting of hydrogen and alkyl radicals, substituted or unsubstituted, having from 1 to 10 carbon atoms and combinations thereof, and where each of the Z groups may be the same or different.

12. A process, according to claim 11, wherein said aromatic acid is isophthalic acid.

13. A process, according to claim 1, wherein said aromatic acid has a concentration of from about 0.01 to about 8 weight percent per copolyester resin weight.

14. A process, according to claim 13, wherein said aromatic acid has a concentration of from about 0.5 to about 2.0 weight percent per copolyester resin weight.

15. A copolyester resin subject to controlled reaction with an epoxide compound, comprising:

the mixture of the copolyester resin and an aromatic acid, said mixture having moderated termini for controlled curing upon heating of the mixture of said reaction product and an epoxide compound;

said aromatic acid having at least 1 carboxylic acid group and having from 7 to 20 carbon atoms, said aromatic acid reacting in a concentration of from about 0.001 to about 10 weight percent per copolyester resin weight.

16. A copolyester resin, according to claim 15, wherein said mixing occurs during the polymerization of the copolyester resin such that said aromatic acid interacts with the termini of the copolyester resin forming moderated termini.

17. A copolyester resin, according to claim 16, wherein said polymerization of the copolyester resin comprises an esterification stage, a condensation stage, a reactor compounding stage, and a finishing stage;

and wherein said mixing occurs during said reactor compounding stage.

18. A composition, according to claim 17, wherein said reactor compounding stage further comprises reacting from about 0.001 to 10.0 weight percent per copolyester resin weight of a curing reaction catalyst with the copolyester resin, such that the copolyester resin has activated termini prior to compounding the copolyester resin with the epoxide compound, said activated termini permitting rapid curing of the copolyester resin after said compounding and during heating of the copolyester-epoxide mixture, subject to control and moderation of the activation energy of the curing action by said aromatic acid through said moderated termini.

19. A copolyester resin, according to claim 17, wherein said esterification stage comprises reacting a diol and a dicarboxylic compound to form a polyester prepolymer;

said dicarboxylic compound is selected from the group consisting of dicarboxylic acids and dicarboxylic esters, said dicarboxylic acids having a total of from 2 to 16 carbon atoms, and aryl dicarboxylic acids, having a total of from 8 to 16 carbon atoms, said dicarboxylic esters are selected from the group consisting of alkyl diesters having from 2 to 20 carbon atoms, and alkyl substituted aryl diesters having from 10 to 20 carbon atoms;

and said diol is in a concentration from about 115 to 220 mole percent of the concentration of said dicarboxylic compound and is selected from the group consisting of diols having from 2 to 10 carbon atoms.

20. A copolyester resin, according to claim 19, wherein said esterification stage further comprises reacting said diol and said dicarboxylic compound with a chain branching agent to form an internally branched polyester prepolymer;

said chain branching agent is in a concentration of less than about 10 mole percent of the concentration of said dicarboxylic compound and is selected from the group consisting of trimellitic anhydride, pentaerythritol, glycerol, trimethylol propane, triethylol propane, and combinations thereof.

21. A copolyester resin, according to claims 19 or 20, wherein said condensation stage comprises polymerizing said polyester prepolymer to from a polycondensed copolyester having an intrinisic viscosity of from about 0.10 to about 0.26 dl/g in a 60/40 by weight mixture of phenol/tetrachloroethane, and having a glass transition temperature of at least 50° C.

22. A copolyester resin, according to claim 21, wherein said compounding preparation stage further comprises reacting a carboxyl capping agent with the copolyester resin so that from 1 mole percent to about 25 mole percent of the total carboxylate units in the finished copolyester are derived from the capping agent.

23. A copolyester resin, according to claim 22, wherein said carboxyl capping agent is the anhydride of an acid having at least two acid groups, which upon reaction with the terminus of the polymer chain, retains at least one free carboxyl acid group.

24. A copolyester resin, according to claim 23, wherein said carboxyl capping agent is an anhydride selected from the group of compounds having the following formulae:

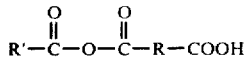

where R is selected from the group consisting of an alkyl radical having from 1 to 18 carbon atoms, a halo-substituted alkyl radical having from 1 to 18 carbon atoms, a hydroxy substituted alkyl radical having 1 to 18 carbon atoms, an aryl radical having from 6 to 24 carbon atoms, an aralkyl radical having from 7 to 24 carbon atoms; where R′ is an organic radical volatile at temperatures of the carboxyl capping reaction;

and anhydrides of the formula:

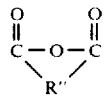

where R″ is an organic radical having from 1 to 18 carbon atoms.

25. A copolyester resin, according to claim 24, wherein said carboxylic terminus-capping agent is trimellitic anhydride.

26. A copolyester resin, according to claim 15, wherein said aromatic acid is selected from the group consisting of benzoic acid and compounds having the formula:

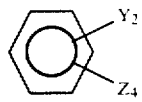

where Y is selected from the group consisting of carboxylic acid substituted alkyl radicals having from 1 to 10 carbon atoms and combinations thereof, and where the Y groups may be the same or different;

and where Z is selected from the group consisting of hydrogen and alkyl radicals, substituted or unsubstituted, having from 1 to 10 carbon atoms, and combinations thereof, and where each of the Z groups may be the same of different.

27. A copolyester resin, according to claim 26, wherein said aromatic acid is isophthalic acid.

28. A copolyester resin, according to claim 27, wherein said aromatic acid has a concentration of from about 0.01 to about 8 weight percent per copolyester resin weight.

29. A copolyester resin, according to claim 28, wherein said aromatic acid has a concentration of from about 0.5 to about 2.0 weight percent per copolyester resin weight.

* * * * *